United States Patent
Ching et al.

(10) Patent No.: US 6,437,086 B1
(45) Date of Patent: Aug. 20, 2002

(54) NON-EXTRACTABLE POLYMERIC METAL SALT USEFUL IN CATALYZING OXYGEN SCAVENGING

(75) Inventors: Ta Yen Ching, Novato; Gangfeng Cai, Danville; Hu Yang, San Ramon, all of CA (US)

(73) Assignee: Chevron Phillips Chemical Company LP, Houston, TX (US)

( * ) Notice: Subject to any disclaimer, the term of this patent is extended or adjusted under 35 U.S.C. 154(b) by 0 days.

(21) Appl. No.: 09/680,337

(22) Filed: Oct. 5, 2000

(51) Int. Cl.[7] ............................................. C08G 63/02
(52) U.S. Cl. ...................................... 528/272
(58) Field of Search ........................................ 528/272

(56) References Cited

U.S. PATENT DOCUMENTS

| | | | |
|---|---|---|---|
| 3,497,571 A | 2/1970 | Tellier et al. ................ 260/844 |
| 3,536,687 A | 10/1970 | Nordstrom .................. 260/89.5 |
| 4,134,927 A | * 1/1979 | Tomoshige .................. 260/878 |
| 4,415,710 A | 11/1983 | Barnabeo et al. ............ 525/370 |
| 4,524,201 A | 6/1985 | Barnabeo et al. ............ 528/395 |
| 5,116,916 A | 5/1992 | Young ......................... 525/350 |
| 5,211,875 A | 5/1993 | Speer et al. ............ 252/188.28 |
| 5,346,644 A | 9/1994 | Speer et al. ............ 252/188.28 |
| 5,425,896 A | 6/1995 | Speer et al. ............ 252/188.28 |
| 5,466,756 A | 11/1995 | Roach et al. ............. 525/330.6 |
| 5,498,364 A | 3/1996 | Speer et al. ............ 252/188.28 |
| 5,627,239 A | 5/1997 | Ching et al. ............. 525/330.6 |
| 5,641,825 A | 6/1997 | Bacskai et al. ............. 524/398 |
| 5,656,692 A | 8/1997 | Hayes ........................... 525/63 |
| 5,660,761 A | 8/1997 | Katsumoto et al. ..... 252/188.28 |
| 5,700,554 A | 12/1997 | Speer et al. ................. 428/220 |
| 5,736,616 A | 4/1998 | Ching et al. ............. 525/330.3 |
| 5,776,361 A | 7/1998 | Katsumoto et al. ..... 252/188.28 |
| 5,837,158 A | 11/1998 | Shepodd et al. .......... 252/181.6 |
| 5,859,145 A | 1/1999 | Ching et al. ............. 525/330.6 |
| RE36,234 E | * 6/1999 | Koskan ........................ 528/363 |
| 6,057,013 A | 5/2000 | Ching et al. ................ 428/35.7 |
| 6,063,307 A | 5/2000 | Shepodd et al. .......... 252/181.6 |

FOREIGN PATENT DOCUMENTS

| | | |
|---|---|---|
| EP | 0 059 883 | 9/1982 |
| EP | 0 507 207 | 10/1992 |
| EP | 0 520 257 | 12/1992 |
| GB | 1 232 194 | 5/1971 |
| WO | WO97/32925 | 9/1997 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

PCT/US01/28412 International Search Report (Mar. 18, 2002).

* cited by examiner

Primary Examiner—Paul R. Michl
(74) Attorney, Agent, or Firm—Williams, Morgan & Amerson, P.C.

(57) ABSTRACT

Herein are disclosed polymeric metal salts useful in catalyzing oxygen scavenging by oxygen scavenging polymers. The polymeric metal salts comprise structure I:

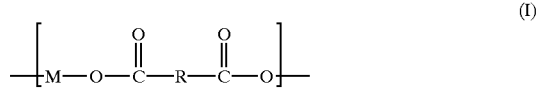

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium. These polymeric metal salts are substantially non-extractable from a packaging article comprising the metal salts. Also disclosed are packaging articles comprising the polymeric metal salts, and methods of synthesizing the polymeric metal salts.

56 Claims, No Drawings

NON-EXTRACTABLE POLYMERIC METAL SALT USEFUL IN CATALYZING OXYGEN SCAVENGING

BACKGROUND OF THE INVENTION

1. Field of the Invention

The present invention relates generally to the field of compounds useful in catalyzing oxygen scavenging by oxygen scavenging polymers. Particularly, it concerns polymeric metal salts, especially polymeric cobalt salts.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, technique for limiting oxygen exposure involves incorporating an oxygen scavenger into the packaging structure. Incorporation of a scavenger in the package can scavenge oxygen present inside the package. The oxygen thus scavenged either can be present in the interior when product is filled into the package, or can migrate into the package after product is filled. In addition, such incorporation can provide a means of intercepting and scavenging oxygen as it passes through the walls of the package (herein referred to as an "active oxygen barrier"), thereby maintaining the lowest possible oxygen level throughout the package.

In many cases, however, the onset of oxygen scavenging in this system may not occur for days or weeks. The delay before the onset of useful oxygen scavenging is hereinafter referred to as the induction period. In addition, the rate of oxygen scavenging may also be relatively low. Much work has been done both to minimize the induction period and increase the scavenging rate. One common approach that is useful in both areas is the use of metal salts with organic counterions, such as cobalt oleate, as catalysts for oxygen scavenging in a packaging article. These metal salts can be used in multilayer-film packaging applications, wherein the layer containing the metal salts (either an oxygen scavenging layer or a layer adjacent to an oxygen scavenging layer) is not in direct contact with food.

However, these low molecular weight metal salts with organic counterions, if used in single-layer-film packaging applications wherein the film is in direct contact with food, may on occasion pose a problem with extractability in some situations. Some organic counterions are not on the U.S. Food and Drug Administration (FDA) generally regarded as safe (GRAS) list. Therefore, it is desirable to have metal salts that are substantially nonextractable in standard tests of a single-layer-film packaging application.

SUMMARY OF THE INVENTION

In one embodiment, the present invention is directed to a polymeric metal salt, preferably one comprising structure I:

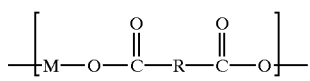

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium.

In a related embodiment, the present invention relates to a composition comprising the polymeric metal salt and an oxygen scavenging polymer. Preferably, the oxygen scavenging polymer comprises an ethylenic backbone and at least one cyclic olefinic pendant group comprising structure (III):

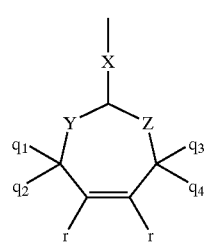

wherein X is —$(CH_2)_n$—, wherein n is an integer from 0 to 4, inclusive; Y is —$(CRR')_a$—, wherein a is 0, 1, or 2; and Z is —$(CRR')_b$—, wherein b is 0, 1, or 2, provided that a+b 3; and $q_1$, $q_2$, $q_3$, $q_4$, r, R, and R' are independently selected from hydrogen; linear, branched, cyclic, or polycyclic $C_1$–$C_{20}$ alkyl; aromatic groups; halogens; amines; or sulfur-containing substituents, provided that at least one of $q_1$, $q_2$, $q_3$, or $q_4$ is hydrogen.

In another embodiment, the present invention relates to a packaging article comprising at least one layer comprising the composition of the present invention.

The present invention provides the advantage of providing a substantially non-extractable metal salt for use in catalyzing oxygen scavenging by an oxygen scavenging layer of a packaging article.

DESCRIPTION OF ILLUSTRATIVE EMBODIMENTS

In one embodiment, the present invention is directed to a polymeric metal salt. By "polymeric metal salt" is meant a metal salt comprising at least two metal counterions and having a molecular weight greater than about 500. Any metal salt comprising an organic counterion can be used. Preferably, the polymeric metal salt comprises structure I:

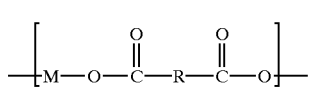

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium.

The metal component of the metal salt is preferably one capable of catalyzing oxygen scavenging by an oxygen scavenging polymer, as will be described in more detail below. Preferably, M is selected from manganese, copper, or cobalt. More preferably, M is cobalt.

In reference to the R group of the organic counterion, "alkyl" is defined as being a hydrocarbon chain comprising carbon-carbon single bonds and no carbon-carbon double bonds or triple bonds. "Branched alkyl" means that the hydrocarbon chain comprises at least one carbon which bonds with three other carbon atoms (except when such carbon is a component of a cyclic group). A "cycloalkyl" is defined as an alkyl chain comprising at least one ring. An alkyl can be both a branched alkyl and a cycloalkyl. "Alkenyl" refers to a hydrocarbon chain comprising at least one carbon-carbon double bond. "Branched alkenyl" and "cycloalkenyl" are defined analogously to branched alkyl and cycloalkyl, above. A "branched alkyl [or alkenyl] acid [or diacid]" is a branched hydrocarbon chain wherein at least one branch (in the case of the acid) or at least two branches (in the case of the diacid) terminate with a —COOH moiety.

The organic counterion of the metal salt can be selected based on the intended use of the metal salt and the structural properties desired for the metal salt or a polymer composition blended with the metal salt. For example, if R is an alkyl, a cycloalkyl, a branched alkyl, an alkenyl, a cycloalkenyl, or a branched alkenyl, the resulting polymer will generally have a linear geometry. If R is a branched alkyl or alkenyl acid or diacid, the resulting polymer can sometimes have a three-dimensional geometry. If R is an alkenyl, it will typically be capable of consuming oxygen; however, such consumption may result in disruption of the carbon-carbon double bond and degradation of the polymer. If R is a cycloalkenyl, wherein the ring comprises a carbon-carbon double bond, consumption of oxygen will typically not lead to degradation of the polymer.

Preferably, if some concentration of R groups are branched alkyl or alkenyl acid or diacid, the concentration is relatively low, preferably less than about 10% of all R groups. This low concentration is sufficient to make a branched polymeric metal salt, but the polymeric metal salt retains enough monoacid character to inhibit excessive crosslinking.

Preferably, R is selected from $C_1$–$C_{12}$ alkyl, $C_5$–$C_{12}$ cycloalkyl, $C_2$–$C_{40}$ branched alkyl, or $C_5$–$C_{12}$ cycloalkenyl.

In addition, the metal salt can further comprise a capping group, wherein the capping group is at a terminus of the molecule, which capping group can be any monoacid capable of forming a –COOM structure with the metal M. Preferably, the capping group has the structure II:

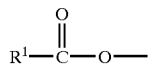
(II)

wherein $R^1$ is selected from $C_1$–$C_{20}$ alkyl, $C_5$–$C_{20}$ cycloalkyl, $C_3$–$C_{20}$ branched alkyl, $C_2$–$C_{20}$ alkenyl, $C_5$–$C_{20}$ cycloalkenyl, or $C_3$–$C_{20}$ branched alkenyl.

Because the polymeric metal salt comprises a transition metal, it is capable of catalyzing oxygen scavenging by an oxygen scavenging polymer. Therefore, in another embodiment, the present invention relates to an oxygen scavenging composition, comprising: an oxygen scavenging polymer, and a polymeric metal salt, as described above.

Any polymer known to react irreversibly with oxygen can be used as the oxygen scavenging polymer. Preferably, the oxygen scavenging polymer comprises an ethylenic backbone and at least one cyclic olefinic pendant group comprising the structure (III):

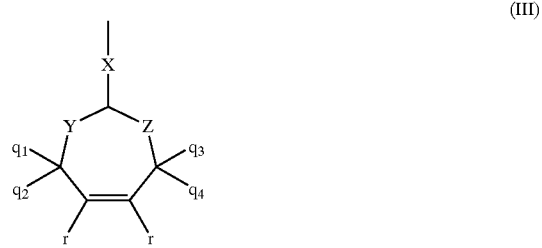
(III)

wherein X is —$(CH_2)_n$—, wherein n is an integer from 0 to 4, inclusive; Y is —$(CRR')_a$—, wherein a is 0, 1, or 2; and Z is —$(CRR')_b$—, wherein b is 0, 1, or 2, provided that a+b 3; and $q_1$, $q_2$, $q_3$, $q_4$, r, R, and R' are independently selected from hydrogen; linear, branched, cyclic, or polycyclic $C_1$–$C_{20}$ alkyl; aromatic groups; halogens; amines; or sulfur-containing substituents, provided that at least one of $q_1$, $q_2$, $q_3$, or $q_4$ is hydrogen. Such an oxygen scavenging polymer will lead to a very low level of oxidative degradation byproducts.

In one preferred embodiment, the oxygen scavenging polymer is poly(ethylene/vinyl cyclohexene) (EVCH).

In an alternative embodiment, the oxygen scavenging polymer can further comprise linking groups linking the backbone with the pendant groups, wherein the linking groups are selected from:

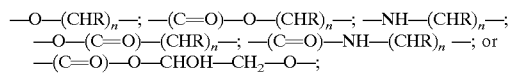

wherein R is hydrogen, methyl, ethyl, propyl, or butyl; and n is an integer from 1 to 12, inclusive. Preferably, the oxygen scavenging polymer is selected from ethylene/methyl acrylate/cyclohexenyl methyl acrylate terpolymer (EMCM), poly(cyclohexene methyl methacrylate) (CHMA), or poly(cyclohexene methyl acrylate) (CHAA).

The polymeric metal salt is as described above.

Because the composition is useful in oxygen scavenging, compounds commonly used with oxygen scavenging polymers can be added to enhance the oxygen scavenging functionality of the composition in storage, processing into a layer of a packaging article, or use of the packaging article. (The composition, when in the form of a layer of a packaging article, may herein be referred to as an "oxygen scavenging layer"). Such enhancements include, but are not limited to, limiting the rate of oxygen scavenging prior to filling of the packaging article with a product, initiating oxygen scavenging at a desired time, or limiting the induction period (the period between initiating oxygen scavenging and scavenging of oxygen at a desired rate), among others.

A compound that is often preferably added to the oxygen scavenging composition is a photoinitiator, or a blend of different photoinitiators, especially if antioxidants are included to prevent premature oxidation of the cyclic olefinic groups of the composition.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de] anthracene-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene -7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is optional but preferable because it generally provides faster and more efficient initiation of oxygen scavenging by the cyclic olefinic groups of the oxygen scavenging polymer. However, due to the cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the EDI).

Photoinitiators that are especially useful in the present invention include benzophenone derivatives containing at least two benzophenone moieties, as described in copending U.S. patent application 08/857,325, filed May 16, 1997. These compounds act as effective photoinitiators to initiate oxygen scavenging activity in oxygen scavenging compositions. Such benzophenone derivatives have a very low degree of extraction, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicylic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

wherein A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as an ether, ketone, ester, or alcohol.

The substituents of B, herein R", when present, are individually selected from alkyl, aryl, alkoxy, phenoxy, or alicylic groups containing from 1 to 24 carbon atoms, or halides. Each benzophenone moiety can have from 0 to 9 substituents. Substituents can be selected to render the photoinitiator more compatible with the oxygen scavenging composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by the cyclic olefinic groups of the oxygen scavenging polymer upon exposure to radiation. The amount of photoinitiator can vary. In many instances, the amount will depend on the oxygen scavenging polymer used, the wavelength and intensity of UV radiation used, the nature and amount of antioxidants used, as well as the type of photoinitiator used. The amount of photoinitiator also depends on the intended use of the oxygen scavenging layer. For instance, if the photoinitiator-containing component is placed underneath a layer which is somewhat opaque to the radiation used, more initiator may be needed. For most purposes, however, the amount of photoinitiator, when used, will be in the range of 0.01 to 10% by weight of the total oxygen scavenging composition.

Antioxidants may be used in the composition to control scavenging initiation by the cyclic olefinic groups of the oxygen scavenging polymer. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the cyclic olefinic groups of the oxygen scavenging polymer in the packaging article, the packaging article (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on the rate of oxygen scavenging by the cyclic olefinic groups of the oxygen scavenging composition. As mentioned earlier, antioxidants are usually present in compositions comprising an oxygen scavenging polymer or a structural polymer to prevent oxidation or gelation of the polymers. Typically, they are present in about 0.01 to 1% by weight of the composition. However, additional amounts of antioxidant may also be added if it is desired to increase the induction period as described above.

The oxygen scavenging composition can comprise film-forming structural polymers. Such polymers are thermoplastic or thermosetting and render the oxygen scavenging layer more adaptable for use in a packaging article. Suitable structural polymers include, but are not limited to, polypropylene (PP), polystyrene (PS), polyethylene (PE), low density polyethylene, linear low density polyethylene, ultra-low density polyethylene, high density polyethylene, polyethylene terephthalate (PET), polyvinyl chloride, and ethylene copolymers such as ethylene-vinyl acetate, ethylene-alkyl (meth)acrylates, ethylene-(meth)acrylic acid and ethylene-(meth)acrylic acid ionomers. In rigid articles, such as beverage containers, PET, PP, or PS are often used. Blends of different structural polymers may also be used. However, the selection of the structural polymer largely depends on the article to be manufactured and the end use thereof. Such selection factors are well known in the art. For instance, the clarity, cleanliness, effectiveness as an oxygen scavenger, barrier properties, mechanical properties, or texture of the article can be adversely affected by a blend containing a structural polymer which is incompatible with the oxidizable organic compound.

When one or more structural polymers are used, those polymers can comprise, in total, as much as 99% by weight of the oxygen scavenging layer.

Also, additives which can be included in the oxygen barrier layer include, but are not necessarily limited to, fillers, pigments, dyestuffs, stabilizers, processing aids, plasticizers, fire retardants, and anti-fog agents, among others.

Any additives employed normally will not comprise more than 10% of the oxygen barrier composition by weight, with preferable amounts being less than 5% by weight of the composition.

As stated above, the oxygen scavenging composition of the present invention can be used as an oxygen scavenging layer of a packaging article. Therefore, in another embodiment, the present invention relates to a packaging article, comprising an oxygen scavenging layer, wherein the oxygen scavenging layer comprises an oxygen scavenging polymer and a polymeric metal salt, comprising structure I:

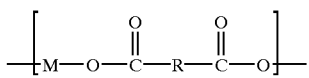

(I)

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium.

The oxygen scavenging polymer, the polymeric metal salt, and other compounds that optionally can be included in the oxygen scavenging layer, such as a photoinitiator, an antioxidant, a structural polymer, or additives, are as described above.

Packaging articles typically come in several forms including a single layer film, a multilayer film, a single layer rigid article, or a multilayer rigid article. Typical rigid or semi-rigid articles include plastic, paper or cardboard cartons or bottles such as juice containers, soft drink containers, thermoformed trays, or cups, which have wall thicknesses in the range of 100 to 1000 micrometers. Typical flexible bags include those used to package many food items, and will likely have thicknesses of 5 to 250 micrometers. The walls of such articles comprise either single or multiple layers of material.

The oxygen scavenging composition can be in the form of an oxygen scavenging layer in a single-layer or multilayer packaging article. The additional layers of a multilayer packaging article may further comprise a structural layer or layers, an oxygen barrier layer or layers, or a combination thereof, among others.

In a structural layer, suitable structural polymers include, but are not limited to, polyethylene, low density polyethylene, very low density polyethylene, ultra-low density polyethylene, high density polyethylene, polypropylene, poly(ethylene terephthalate) (PET), poly(ethylene naphthalate) (PEN), ethylene-vinyl acetate, ethylene-alkyl (meth)acrylates, ethylene-(meth)acrylic acid, or ethylene-(meth)acrylic acid ionomers. Paperboard or cardboard can also be used as the structural component for carton applications. Preferred components of the structural component include PET and paperboard.

The additional layers of a multilayer material may further comprise at least one oxygen barrier layer, i.e. a layer having an oxygen transmission rate equal to or less than 50 cubic centimeters per square meter ($cc/m^2$) per day per atmosphere at room temperature (about 25° C.). Typical oxygen barriers comprise poly(ethylene vinyl alcohol), polyacrylonitrile, polyvinyl chloride, poly(vinylidene dichloride), polyethylene terephthalate, silica, polyamides, or mixtures thereof.

The packaging article comprising the oxygen scavenging composition can be used to package any product for which it is desirable to inhibit oxygen damage during storage, e.g. food, beverage, pharmaceuticals, medical products, corrodible metals, or electronic devices.

As stated above, the packaging article comprising the oxygen scavenging layer can comprise a single layer comprising the oxygen scavenging composition, or an oxygen scavenging layer or layers and additional layers. Single layered packaging articles can be prepared by solvent casting, injection molding, blow molding, or extrusion. Packaging articles with multiple layers are typically prepared using coextrusion, injection molding, blow molding, coating, or lamination.

Other additional layers of the packaging article may include one or more layers which are permeable to oxygen (an "oxygen permeable layer") and are located on the interior surface of the packaging article, i.e. between the packaged product and the oxygen scavenging layer. In one packaging article, preferred for flexible packaging of food, the layers include, in order starting from the outside of the package to the innermost layer of the package, (i) an optional oxygen barrier layer, (ii) an oxygen scavenging layer, and (iii) an optional oxygen-permeable layer. Control of the oxygen barrier property of (i) allows regulation of the scavenging life of the oxygen scavenging layer by limiting the rate of oxygen entry to the oxygen scavenging moieties in layer (ii), and thus slows the consumption of oxygen scavenging capacity by ingress oxygen. Control of the oxygen permeability of layer (iii) allows setting the rate of oxygen passage from the packaged product to the oxygen scavenging moieties in layer (ii). Furthermore, layer (iii) can provide a barrier to migration of the components of the oxygen scavenging layer or by-products of scavenging, into the package interior. However, if the oxygen scavenging polymer comprises a cyclic olefinic group, few, if any, scavenging byproducts capable of migrating into the package interior would be expected to be produced. Also, the polymeric metal salt would also be expected to have negligible migration of the salt or any breakdown products into the package interior. Therefore, a migration barrier function for layer (ii) may be dispensed with in some embodiments.

Even further, layer (iii) can improve the heat-sealability, clarity, or resistance to blocking of the multilayer packaging article.

Further additional layers, such as adhesive layers, may also be used. Compositions typically used for adhesive layers include anhydride functional polyolefins and other well-known adhesive layers.

In another embodiment, the present invention relates to a method of synthesizing a polymeric metal salt, comprising: (i) providing metal hydroxide (M(OH)$_x$), wherein M is selected from manganese, iron, cobalt, nickel, copper, rhodium, or ruthenium, and x is an integer from 2 to 4; and at least one organic diacid having structure IV:

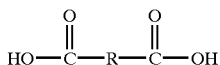
(IV)

wherein R is selected from $C_1$–$C_{12}$ alkyl, $C_5$–$C_{12}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and (ii) reacting the metal hydroxide and the organic diacid at a temperature below about 240° C., to form the polymeric metal salt.

The reaction proceeds analogously to transesterification, with an —MOH group of the metal hydroxide and an HOOCR— group of the organic diacid combining to form an —MOOCR— group of the polymeric metal salt, with water generated as a byproduct.

Regarding the metal hydroxide, M is preferably selected from manganese, copper, or cobalt; more preferably, M is cobalt, and x is 2. Regarding the organic diacid, R is preferably selected from adipic acid, sebacic acid, and dimer fatty acid. It should be noted that "diacid," in this context, may refer to a molecule with more than two carboxylic acid moieties, i.e. R can comprise at least one carboxylic acid moiety.

The method can further comprise providing at least one organic monoacid having the structure V:

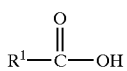
(V)

wherein $R^1$ is selected from hydrogen, $C1$–$C_{20}$ alkyl, $C_5$–$C_{20}$ cycloalkyl, $C_2$–$C_{20}$ alkenyl, or $C_5$–$C_{20}$ cycloalkenyl; and reacting the organic monoacid with the metal hydroxide and the organic diacid to form a capping group. The reaction will lead to formation of an $R^1$COOM— group, wherein $R^1$ cannot further react with other —MOH to extend the polymeric metal salt.

The temperature of the reaction is desirably kept below about 240° C. to minimize side reactions, such as oxidation. It should be borne in mind that lower temperatures lead to greater viscosity of the reaction mixture and a slower reaction. However, it has been observed that a batch process wherein the temperature is from about 135° C. to about 220° C. and the reaction duration is about 5 hr to about 6 hr is effective in synthesizing the polymeric metal salt.

The method can be performed either in bulk, as a melt, or in solution. If performed in solution, an appropriate organic solvent such as toluene can be used. The polymeric metal salt product can be stored in the solvent, e.g. as a solution in 50 wt% toluene, or it can be stored neat. If the polymeric metal salt is tacky, but storage as a solution in toluene is not desired, the polymeric metal salt can be processed according to the teachings of copending U.S. patent application Ser. No. 09/510,013, which is incorporated herein by reference.

Specifically, in one embodiment, the polymeric metal salt can be in the form of a masterbatch composition comprising porous beads comprising a first polymer; the polymeric metal salt dispersed in the porous beads; and a second polymer or a photoinitiator, in powder form, dispersed on the exteriors of the porous beads. Such a masterbatch composition can be prepared by a method comprising (i) providing a solution of polymeric metal salt in an organic solvent; (ii) dispersing the solution into the beads, to form solvated beads; (iii) evaporating the solvent from the solvated beads, to form polymeric metal salt dispersed in the beads; and (iv) mixing the second polymer or the photoinitiator, in powder form, with the beads, to form the composition.

In another embodiment, the masterbatch composition comprises the polymeric metal salt and a polymer, wherein the polymeric metal salt is in the form of pellets, and the polymer is in the form of a powder dispersed on the exteriors of the pellets. Such a masterbatch composition can be prepared by a method comprising (i) providing the polymeric metal salt in the form of pellets, and (ii) dispersing the polymer in the form of a powder on the exteriors of the pellets.

In yet another embodiment, the masterbatch composition comprises the polymeric metal salt and a polymer, wherein the polymeric metal salt and the polymer are compounded. Such a masterbatch can be prepared by a method comprising (i) providing the polymeric metal salt in the form of pellets and providing the polymer as a solid and (ii) compounding the polymeric metal salt and the polymer.

In still another embodiment, the masterbatch composition is prepared from a composition comprising the polymeric metal salt and a polymer, wherein the polymer is in the form of a container, such as a bag, and the polymeric metal salt is contained within the container. The composition is processed to form a masterbatch, or directly into an oxygen scavenging component of an oxygen scavenging packaging article, by the method of (i) providing the composition comprising the polymeric metal salt and a polymer, wherein at least some of the polymer is in the form of a container and the polymeric metal salt is contained within the container, (ii) melting the composition to produce a melted composition, and (iii) mixing the melted composition to produce a masterbatch. The method can further comprise grinding the composition, before or during the heating step.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

A 3-L 3-neck flask equipped with mechanical stirrer, nitrogen sparge, condenser, and thermocouple was charged with 570 g (about 1 mole) dimer fatty acid (a mixture comprising primarily oleic acid and linoleic acid, with a trace of linolinic acid, heated and treated with $H_2SO_4$ to generate $C_{36}$ diacids as well as traces of the monoacid starting materials and other reaction products), 282 g (about 1 mole) oleic acid, and 800 mL toluene containing 5 g of octadecyl-3,5-bis(1,1-dimethylethyl)-4-hydroxybenzene propanoate as an antioxidant (available as Irganox 1075, Ciba). The temperature was raised to about 85° C., and about 140 g (about 1.5 mole) cobalt hydroxide was added slowly (approximately 1 hr). After the exotherm generated by addition of the cobalt hydroxide retreated from its peak, the temperature of the reaction mixture was increased to about 145° C. and held at that temperature for about 5 hr to about 6 hr, until about 54 g (about 3 mole) water was collected, i.e. the reaction substantially went to completion. The vessel was then cooled to room temperature, and toluene was added up to 50 wt% of the vessel contents.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A polymeric metal salt, comprising structure I:

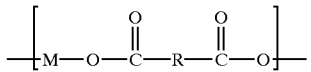

(I)

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium.

2. The metal salt of claim 1, wherein M is selected from manganese, copper, or cobalt.

3. The metal salt of claim 2, wherein M is cobalt.

4. The metal salt of claim 1, wherein R is selected from $C_6$–$C_8$ alkyl or $C_{34}$ branched alkyl.

5. The metal salt of claim 1, further comprising a capping group having the structure (II):

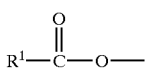

(II)

wherein $R^1$ is selected from hydrogen, $C_1$–$C_{20}$ alkyl, $C_5$–$C_{20}$ cycloalkyl, $C_2$–$C_{20}$ alkenyl, or $C_5$–$C_{20}$ cycloalkenyl.

6. The metal salt of claim 5, wherein $R^1$ is selected from $C_4$–$C_{17}$ alkyl or $C_4$–$C_{17}$ alkenyl.

7. An oxygen scavenging composition, comprising:

an oxygen scavenging polymer, and a polymeric metal salt, comprising structure I:

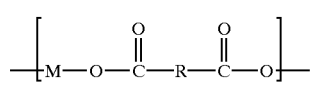

(I)

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium.

8. The composition of claim 7, wherein the oxygen scavenging polymer comprises an ethylenic backbone and at least one cyclic olefinic pendant group comprising the structure (III):

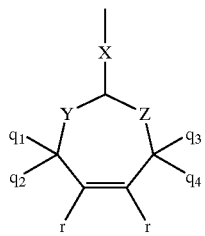

(III)

wherein X is —$(CH_2)_n$—, wherein n is an integer from 0 to 4, inclusive; Y is —$(CRR')_a$—, wherein a is 0, 1, or 2; and Z is —$(CRR')_b$—, wherein b is 0, 1, or 2, provided that a+b 3; and $q_1$, $q_2$, $q_3$, $q_4$, r, R, and R' are independently selected from hydrogen; linear, branched, cyclic, or polycyclic $C_1$–$C_{20}$ alkyl; aromatic groups; halogens; amines; or sulfur-containing substituents, provided that at least one of $q_1$, $q_2$, $q_3$, or $q_4$ is hydrogen.

9. The composition of claim 8, wherein the oxygen scavenging polymer is poly(ethylene/vinyl cyclohexene) (EVCH).

10. The composition of claim 8, wherein the oxygen scavenging polymer further comprises linking groups linking the backbone with the pendant groups, wherein the linking groups are selected from:

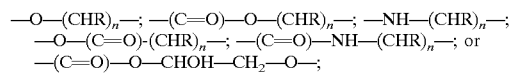

wherein R is hydrogen, methyl, ethyl, propyl, or butyl; and n is an integer from 1 to 12, inclusive.

11. The composition of claim 10, wherein the oxygen scavenging polymer is selected from ethylene/methyl acrylate/cyclohexenyl methyl acrylate terpolymer (EMCM), poly(cyclohexene methyl methacrylate) (CHMA), or poly(cyclohexene methyl acrylate) (CHAA).

12. The composition of claim 7, wherein M is selected from manganese, copper, or cobalt.

13. The composition of claim 12, wherein M is cobalt.

14. The composition of claim 7, wherein R is selected from $C_6$–$C_8$ alkyl or $C_{34}$ branched alkyl.

15. The composition of claim 7, wherein the polymeric metal salt further comprises a capping group having the structure II:

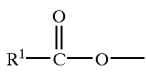

(II)

wherein R¹ is selected from hydrogen, $C_1$–$C_{17}$ alkyl, $C_5$–$C_{17}$ cycloalkyl, $C_2$–$C_{17}$ alkenyl, or $C_5$–$C_{17}$ cycloalkenyl.

16. The composition of claim 15, wherein R¹ is selected from $C_4$–$C_{17}$ alkyl or $C_4$–$C_{17}$ alkenyl.

17. The composition of claim 7, further comprising a photoinitiator.

18. The composition of claim 17, wherein the photoinitiator is selected from benzophenone derivatives containing at least two benzophenone moieties and having the formula:

$A_a(B)_b$ wherein

A is a bridging group selected from sulfur; oxygen; carbonyl; —SiR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;

a is an integer from 0 to 11;

B is a substituted or unsubstituted benzophenone group; and b is an integer from 2 to 12.

19. The composition of claim 18, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted benzoylated styrene oligomer.

20. The composition of claim 7, further comprising an antioxidant.

21. The composition of claim 20, wherein the antioxidant is selected from 2,6-di(t-butyl)-4-methylphenol(BHT), 2,2'-methylene-bis(6-t-butyl-p-cresol), triphenylphosphite, tris-(nonylphenyl)phosphite, vitamin E, tetra-bismethylene 3-(3, 5-ditertbutyl-4-hydroxyphenyl)-propionate methane, or dilaurylthiodipropionate.

22. The composition of claim 7, further comprising a structural polymer.

23. The composition of claim 22, wherein the structural polymer is selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, or ethylene-(meth)acrylic acid ionomer.

24. The composition of claim 23, wherein the structural layer comprises PET.

25. A packaging article, comprising:
an oxygen scavenging layer comprising an oxygen scavenging polymer and a polymeric metal salt, comprising structure I:

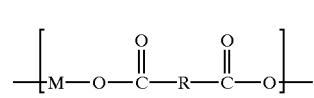

(I)

wherein R is selected from $C_1$–$C_{20}$ alkyl, $C_5$–$C_{20}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and M is selected from manganese, iron, cobalt, nickel, copper, rhodium, or ruthenium.

26. The packaging article of claim 25, wherein the packaging article consists essentially of a single layer.

27. The packaging article of claim 25, wherein the oxygen scavenging polymer comprises an ethylenic backbone and at least one cyclic olefinic pendant group comprising the structure III:

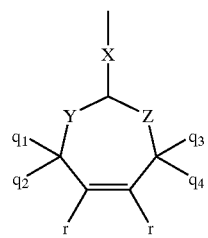

(III)

wherein X is —(CH$_2$)$_n$—, wherein n is an integer from 0 to 4, inclusive; Y is —(CRR')$_a$—, wherein a is 0, 1, or 2; and Z is —(CRR')$_b$—, wherein b is 0, 1, or 2, provided that a+b 3; and q$_1$, q$_2$, q$_3$, q$_4$, r, R, and R' are independently selected from hydrogen; linear, branched, cyclic, or polycyclic C$_1$–C$_{20}$ alkyl; aromatic groups; halogens; amines; or sulfur-containing substituents, provided that at least one of q$_1$, q$_2$, q$_3$, or q$_4$ is hydrogen.

28. The packaging article of claim 27, wherein the oxygen scavenging polymer is poly(ethylene/vinyl cyclohexene) (EVCH), ethylene/methyl acrylate/cyclohexenyl methyl acrylate terpolymer (EMCM), poly(cyclohexene methyl methacrylate) (CHMA), or poly(cyclohexene methyl acrylate) (CHAA).

29. The packaging article of claim 25, wherein M is selected from manganese, copper, or cobalt.

30. The packaging article of claim 29, wherein M is cobalt.

31. The packaging article of claim 25, wherein R is selected from $C_6$–$C_8$ alkyl or $C_{34}$ branched alkyl.

32. The packaging article of claim 25, wherein the polymeric metal salt farther comprises a capping group having the structure II:

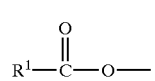

(II)

wherein R¹ is selected from hydrogen, $C_1$–$C_{20}$ alkyl, $C_5$–$C_{20}$ cycloalkyl, $C_2$–$C_{20}$ alkenyl, or $C_5$–$C_{20}$ cycloalkenyl.

33. The packaging article of claim 32, wherein R¹ is selected from $C_4$–$C_{17}$ alkyl or $C_4$–$C_{17}$ alkenyl.

34. The packaging article of claim 25, further comprising a photoinitiator in the oxygen scavenging layer.

35. The packaging article of claim 34, wherein the photoinitiator is selected from benzophenone derivatives containing at least two benzophenone moieties and having the formula:

$A_a(B)_b$ wherein
A is a bridging group selected from sulfur; oxygen; carbonyl; —SiR"2—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;

a is an integer from 0 to 11;

B is a substituted or unsubstituted benzophenone group; and b is an integer from 2 to 12.

36. The packaging article of claim 35, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted benzoylated styrene oligomer.

37. The packaging article of claim 25, further comprising an antioxidant in the oxygen scavenging layer.

38. The packaging article of claim 37, wherein the antioxidant is selected from 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, or dilaurylthiodipropionate.

39. The packaging article of claim 25, further comprising a structural polymer in the oxygen scavenging layer.

40. The packaging article of claim 39, wherein the structural polymer is selected from polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, or ethylene-(meth)acrylic acid ionomers.

41. The packaging article of claim 40, wherein the structural polymer is PET.

42. The packaging article of claim 25, further comprising an oxygen barrier layer.

43. The packaging article of claim 42, wherein the oxygen barrier layer comprises poly(ethylene vinyl alcohol) (EVOH), ethylene/vinyl acetate copolymer, ethylene/styrene copolymer, polyacrylonitrile, polyvinyl chloride (PVC), poly(vinylidene dichloride), polyethylene terephthalate (PET), polyethylene napthalate, or polyamide.

44. The packaging article of claim 25, further comprising a structural layer.

45. The packaging article of claim 44, wherein the structural layer comprises polyethylene, low density polyethylene, very low density polyethylene, ultra-low density polyethylene, high density polyethylene, polyethylene terephthalate (PET), polyvinyl chloride, ethylene-vinyl acetate, ethylene-alkyl (meth)acrylates, ethylene-(meth) acrylic acid, ethylene-(meth)acrylic acid ionomers, or paperboard.

46. The packaging article of claim 45, wherein the structural layer comprises PET or paperboard.

47. The packaging article of claim 25, wherein the packaging article is in the form of a single layer film, a multilayer film, a single layer rigid article, or a multilayer rigid article.

48. The packaging article of claim 25, wherein the oxygen scavenging layer is a liner, coating, sealant, gasket, adhesive, non-adhesive insert, or fibrous mat insert in the packaging article.

49. A method of forming a polymeric metal salt, comprising:
providing a metal hydroxide $(M(OH)_x)$, wherein M is selected from manganese, iron, cobalt, nickel, copper, rhodium, or ruthenium, and x is an integer from 2 to 4, inclusive; and at least one organic diacid having structure IV:

(IV)

wherein R is selected from $C_1$–$C_{12}$ alkyl, $C_5$–$C_{12}$ cycloalkyl, $C_2$–$C_{40}$ branched alkyl, $C_2$–$C_{40}$ branched alkyl acid or diacid, $C_2$–$C_{12}$ alkenyl, $C_5$–$C_{12}$ cycloalkenyl, $C_2$–$C_{40}$ branched alkenyl, or $C_2$–$C_{40}$ branched alkenyl acid or diacid; and, reacting the metal hydroxide and the organic diacid at a temperature below about 240° C., to form the polymeric metal salt.

50. The method of claim 49, wherein M is selected from manganese, copper, or cobalt.

51. The method of claim 50, wherein M is cobalt.

52. The method of claim 49, wherein R is selected from $C_6$–$C_8$ alkyl or $C_{34}$ branched alkyl.

53. The method of claim 49, further comprising providing at least one organic monoacid having the structure V:

(V)

wherein $R^1$ is selected from hydrogen, $C_1$–$C_{20}$ alkyl, $C_5$–$C_{20}$ cycloalkyl, $C_2$–$C_{20}$ alkenyl, or $C_5$–$C_{20}$ cycloalkenyl; and reacting the organic monoacid with the metal hydroxide and the organic diacid.

54. The method of claim 53, wherein $R^1$ is selected from $C_4$–$C_{17}$ alkyl or $C_4$–$C_{17}$ alkenyl.

55. The method of claim 49, wherein the temperature is about 135° C. to about 220° C. and the reaction duration is about 5 hr to about 6 hr.

56. The method of claim 49, further comprising providing toluene as a solvent.

* * * * *

UNITED STATES PATENT AND TRADEMARK OFFICE
CERTIFICATE OF CORRECTION

PATENT NO.    : 6,437,086 B1
DATED         : August 20, 2002
INVENTOR(S)   : Ta Yen Ching, Gangfeng Cai and Hu Yang It is certified that error appears in the above-identified patent and that said Letters Patent is hereby corrected as shown below:

<u>Column 14,</u>
Line 50, change "farther" to -- further --.

Signed and Sealed this

Third Day of December, 2002

JAMES E. ROGAN
*Director of the United States Patent and Trademark Office*